(12) United States Patent
Frederiksen et al.

(10) Patent No.: US 11,454,708 B2
(45) Date of Patent: Sep. 27, 2022

(54) LIDAR DEVICE

(71) Applicant: Robert Bosch GmbH, Stuttgart (DE)

(72) Inventors: Annette Frederiksen, Renningen (DE); Stefan Spiessberger, Weinstadt (DE); Stefanie Hartmann, Rottenburg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 500 days.

(21) Appl. No.: 16/601,714

(22) Filed: Oct. 15, 2019

(65) Prior Publication Data

US 2020/0124710 A1 Apr. 23, 2020

(30) Foreign Application Priority Data

Oct. 17, 2018 (DE) .......................... 102018217731.7

(51) Int. Cl.
*G01S 7/48* (2006.01)
*G01S 7/481* (2006.01)
*G01S 7/486* (2020.01)

(52) U.S. Cl.
CPC .......... *G01S 7/4814* (2013.01); *G01S 7/4868* (2013.01)

(58) Field of Classification Search
None
See application file for complete search history.

(56) References Cited

U.S. PATENT DOCUMENTS

| | | | |
|---|---|---|---|
| 5,255,065 A * | 10/1993 | Schwemmer | G01S 17/42 359/17 |
| 10,003,168 B1 * | 6/2018 | Villeneuve | G01S 7/497 |
| 2007/0181810 A1 * | 8/2007 | Tan | G01S 7/4811 250/341.1 |
| 2007/0296970 A1 * | 12/2007 | Crow | G01S 3/7835 356/328 |

* cited by examiner

*Primary Examiner* — Hovhannes Baghdasaryan
(74) *Attorney, Agent, or Firm* — Norton Rose Fulbright US LLP; Gerard Messina

(57) ABSTRACT

A LIDAR device is described including a beam source for emitting electromagnetic radiation in an emission path, in which at least one holographic optical element is situated for diffracting the emitted electromagnetic radiation, and a detector for detecting incident electromagnetic radiation in a reception path, an optical bandpass filter being connected upstream from the detector. Depending on a wavelength of the emitted electromagnetic radiation, the holographic optical element effectuates a diffraction by at least one angle of reflection which is matched to the shift of the wavelength of the incident electromagnetic radiation with the aid of the bandpass filter.

4 Claims, 1 Drawing Sheet

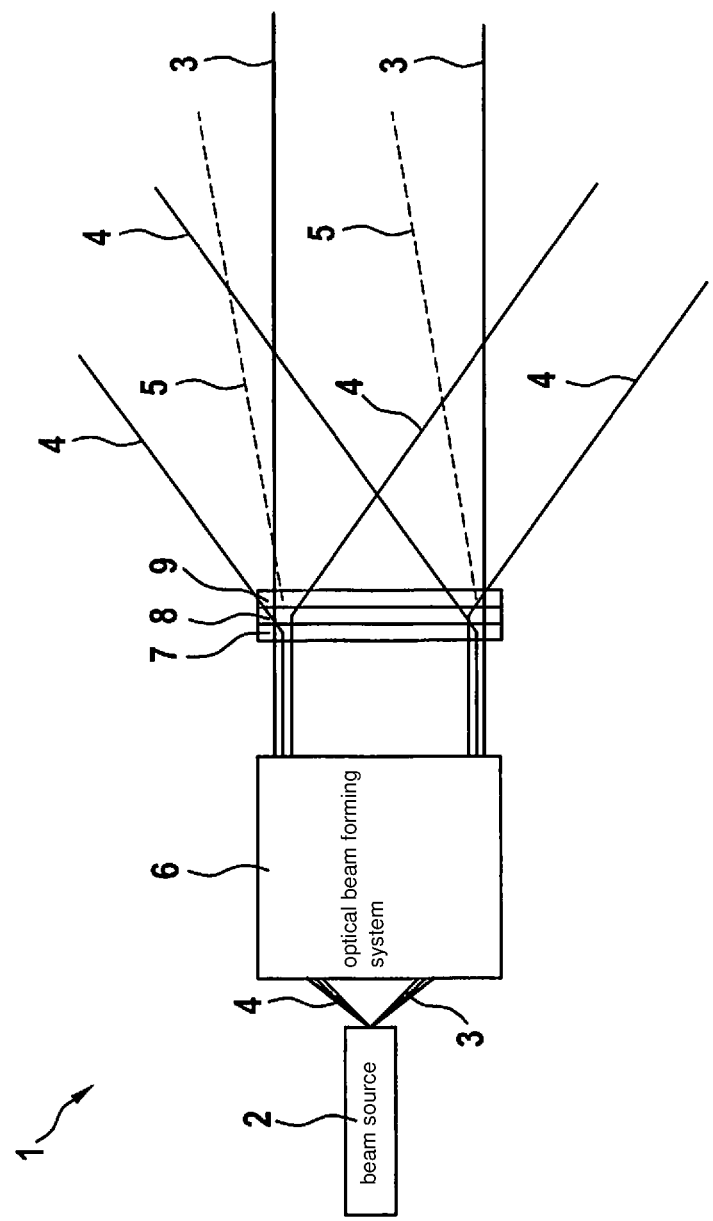

LIDAR DEVICE

CROSS REFERENCE

The present application claims the benefit under 35 U.S.C. § 119 of German Patent Application DE 102018217731.7 filed on Oct. 17, 2018, which is expressly incorporated herein by reference in its entirety.

FIELD

The present invention relates to a LIDAR device including a beam source for emitting electromagnetic radiation in an emission path in which at least one holographic optical element is situated for diffracting the emitted electromagnetic radiation, and including a detector for detecting incident electromagnetic radiation in a reception path, an optical bandpass filter being connected upstream from the detector.

BACKGROUND INFORMATION

LIDAR devices are generally conventional.

In a scanning LIDAR device, electromagnetic radiation, i.e., a laser beam is emitted at different emission angles in the emission path and received again in the reception path. A surroundings image may in turn be derived from these angle-dependent individual measurements. The required deflection of the electromagnetic radiation may in this case be implemented using suitable optics (for example, a moveable mirror) or a rotating system of all components.

Alternatively, the spatial resolution may be implemented using a simultaneous or sequential illumination of a larger area (for example, a line) and a receiver-side differentiation based on imaging optics and a detector array or a detector cell.

An optical bandpass filter (interference filter) is used in the reception path of the LIDAR device in order to improve the signal-to-noise ratio. This occurs in that background light is filtered out and the usable electromagnetic radiation is transmitted. The narrower the optical bandpass filter, the less disruptive electromagnetic radiation strikes the detector and the better is the signal quality. A shifting of the transmission window of the optical bandpass filter occurs when detecting signals with an incidence angle greater than 0 degrees. This leads to the fact that a spectrally broader optical bandpass filter must be used in order to be able to also detect all reception angles in the case of a shifted pass range.

In contrast to conventional optics, when using holographic optical elements, the deflection of the electromagnetic radiation is not determined by refraction, but instead by diffraction. This diffraction may be implemented in volume holograms by diffraction at the volume grating. The holographic optical elements may be manufactured both as transmission holograms and also as reflection holograms, and may be adapted by free selection of the incidence, reflection or diffraction angles. The holographic diffraction grating is thereby exposed in a thin film.

Due to the volume diffraction, the holographic optical elements have a characteristic wavelength sensitivity and angle sensitivity, or also a filter function. Depending on the reception conditions (wavelength, angle), only electromagnetic radiation from defined directions and with defined wavelengths is diffracted at the holographic structure. The holographic material applied on a film is particularly characterized by its transparency. Electromagnetic radiation is only diffracted at the structure from certain directions and wavelengths. The holographic optical element remains transparent for all other directions.

The beam source for emitting electromagnetic radiation may be designed as a semiconductor laser. Semiconductor lasers are used as beam sources, preferably for LIDAR devices, based on their low costs, compact design, and high efficiency. LIDAR devices, which are based on the direct propagation time measurement of an optical pulse (direct time of flight), thereby usually use a broad area laser. These broad area lasers are optimized to provide preferably the most optical output and therefore do not usually have any wavelength sensitive elements. The spectral distribution of the emitted electromagnetic radiation is therefore only defined by the wavelength-dependent yield of the semiconductor structure and by the laser process itself. This leads to these broad area lasers having a comparatively large spectral width. Conventional broad area lasers, which emit at wavelengths of, for example, 905 nm, have a spectral width of, for example, 5 nm to 9 nm.

SUMMARY

According to the present invention, an example LIDAR device is provided in which the holographic optical element causes a diffraction by at least a reflection angle depending on a wavelength of the emitted electromagnetic radiation, which is tailored, with the aid of the bandpass filter, to the shift of the wavelength of the incident electromagnetic radiation.

The example LIDAR device according to the present invention has the following advantages. The emission of different wavelengths is facilitated in a defined spatial angle. The selection of the wavelengths for the different angle ranges is carried out in such a way that they match the shift of the wavelength caused by the angle of the optical bandpass filter used in the reception path. Individual points may be simultaneously or sequentially emitted. Alternatively, ranges or also a continuous line may be emitted.

The emitted electromagnetic radiation has different wavelengths depending on the radiation angle. Thus, it may pass the optical bandpass filter situated in the reception path preferably without loss. Electromagnetic radiation thus has a smaller wavelength at larger emission angles than electromagnetic radiation with smaller emission angles.

The use of these types of holographic optical elements is particularly advantageous in combination with a "broadband" beam source. Due to this arrangement, the filter bandwidth of the LIDAR device may be significantly reduced, whereby the signal-to-noise ratio (SNR) is improved. For example, this arrangement may then be used particularly advantageously if the filter bandwidth used is less than 25 nm and the field of view (FoV) is greater than +/−1 degree.

In other words, a coordination of angle and wavelength of the emission path and of the reception path is thus achieved in the specific embodiment according to the present invention. A filter with a small filter bandwidth may be used in the reception path at simultaneously large angles (i.e., in the case of a large field of view). The LIDAR device has an improved signal-to-noise ratio and thus also a better performance, for example, a larger range. Furthermore, the manufacturing of this type of LIDAR device is economically possible and a space-saving design may be achieved by using holographic optical films as holographic optical elements. Finally, a plurality of emitters also does not have to be used, and a simpler optical design may be implemented for the beam formation, since no deflection has to be provided.

Advantageous refinements of the present invention are described herein.

It is thus advantageous if the LIDAR device includes at least one first holographic optical element, which allows electromagnetic radiation emitted in a first predetermined wavelength range to pass undiffracted.

The first holographic element is preferably a transmission hologram, which is designed as a volume hologram. The part of the emitted electromagnetic radiation in a first predetermined wavelength range—for example, 907 nm—passes the holographic optical element unhindered. It is emitted at an angle of reflection of 0 degrees relative to the propagation direction of the emitted electromagnetic radiation.

It is therein preferred that the first holographic optical element is configured to deflect electromagnetic radiation emitted in a second predetermined wavelength range by a first angle of reflection. The first holographic optical element is a hologram with a deflection function. Electromagnetic radiation, which is incident in a second predetermined wavelength range (different from the first predetermined wavelength range) in the first holographic optical element at an angle of 0 degrees, is deflected at a first angle of reflection relative to the propagation direction of the electromagnetic radiation incident in the first holographic optical element. The first angle of reflection may, for example, be +12 degrees.

However, this optical function is only active for a very narrow second wavelength range—for example, 899 nm+/− 0.5 nm. The parameters of the holographic optical element are selected in such a way that the diffraction efficiency is virtually zero for wavelengths other than the second predetermined wavelength range.

It is advantageous in this case that the LIDAR device includes a second holographic optical element, which is configured to deflect the electromagnetic radiation emitted in the second predetermined wavelength range by a second angle of reflection.

The diffraction efficiency for the desired second wavelength range—for example, 899 nm+/−0.5 nm—is selected in such a way that a part of the electromagnetic radiation in the second wavelength range is not deflected in the first holographic optical element, and thus strikes the second holographic optical element. The second holographic optical element has in turn a deflection function for electromagnetic radiation in the second wavelength range and deflects the electromagnetic radiation by a second angle of reflection. The second holographic optical element preferably has a very high diffraction efficiency.

It is here preferred that the first angle of reflection and the second angle of reflection relative to a propagation direction of the electromagnetic radiation emitted in the first wavelength range have opposite signs.

This means that the deflection of the electromagnetic radiation in the first holographic optical element and in the second holographic optical element is carried out in opposite directions relative to the propagation direction of the emitted electromagnetic radiation (angle of reflection of 0 degrees). For example, the first holographic optical element may effectuate a deflection of +12 degrees and the second holographic optical element may effectuate a deflection of −12 degrees for identical second wavelength ranges. The first angle of reflection may thus be configured exactly opposite to the second angle of reflection.

As a whole, it is also advantageous that the LIDAR device include a third holographic optical element, which is configured to deflect electromagnetic radiation emitted in a third predetermined wavelength range by a third angle of reflection.

The first, second, and third holographic optical elements may thus be designed as a hologram stack, in that the individual holographic optical elements are situated one behind the other in a propagation direction of the electromagnetic radiation. Additional holographic optical elements with the listed features may likewise be provided. These additional holographic optical elements (third, fourth, fifth, . . . ) may each control the remaining angles of reflection not covered by the first holographic optical element and the second holographic optical element. For example, they may populate the other angles between 0 degrees and 12 degrees. The third holographic optical element (and all additional holographic optical elements) may then have, for example, a diffraction efficiency for the wavelength ranges located between 899 nm and 907 nm.

Furthermore, it is preferred for all this, that the first holographic optical element and/or the second holographic optical element and/or the third holographic optical element are designed as transmission volume holograms.

In order to separate the optical functions for the discrete first, second, or third wavelength ranges from each other, the parameters of the first, second or third holographic optical elements must be adapted to the specific application. The selectivity of the holographic optical elements may be adjusted using a defined thickness of the layer used in the holographic optical elements and refractive index modulation. For example, the selectivity of the volume holograms thereby increases at decreasing refractive index modulation. However, the maximum achievable diffraction efficiency of the volume holograms also decreases. This may, in turn, be compensated for by the thickness of the holographic layer. At increasing thickness, the diffraction efficiency increases, whereby the selectivity remains the same.

Finally, it is advantageous if the beam source is designed as a broad area laser. A broad area laser emits a "broad band" electromagnetic radiation. By using a broadband beam source of this type, the present invention may be used particularly advantageously, as was already described above. However, it is possible, in addition to the use of broad area lasers, to likewise use other lasers with broad spectral distributions, for example, lasers with specifically adapted grating structures.

BRIEF DESCRIPTION OF THE DRAWING

Exemplary embodiments of the present invention will be described in greater detail by way of the FIGURE and the description below.

FIG. 1 shows an exemplary embodiment of the present invention.

DETAILED DESCRIPTION OF EXAMPLE EMBODIMENTS

FIG. 1 shows a LIDAR device 1. This LIDAR device 1 includes a beam source 2; this beam source 2 may be a broad area laser. Beam source 2 thus emits, for example, in a spectral width of multiple nm (for example, 8 nm). Beam source 2 emits electromagnetic radiation 3 in a first wavelength range, electromagnetic radiation 4 in a second wavelength range, and electromagnetic radiation 5 in a third wavelength range. The emitted electromagnetic radiation 3, 4, 5 is brought to a desired divergence (for example 0.15 degrees) with the aid of an optical beam forming system 6.

Electromagnetic radiation 3, 4, 5 subsequently strikes an arrangement made up of a first holographic optical element 7, a second holographic optical element 8, and a third holographic optical element 9. These holographic optical elements 7, 8, 9 are preferably transmission holograms, which are designed as volume holograms. These are situated in a hologram stack.

The part of electromagnetic radiation 3 in first wavelength range 3 (for example, 907 nm) passes holographic optical elements 7, 8, 9 unhindered and emits at an angle of reflection of 0 degrees.

First holographic optical element 7 is a hologram with a deflection function, which deflects electromagnetic radiation 4 in a second wavelength range, incident at an angle of 0 degrees, into electromagnetic radiation that exits at a first angle of reflection (here, for example, +12 degrees). This optical function is, however, only active for a very narrow second wavelength range (for example, 899 nm+/−0.5 nm), since the parameters of first holographic element 7 were selected in such a way that the diffraction efficiency is virtually zero for other wavelengths. The diffraction efficiency for the desired second wavelength range (for example, 899 nm+/−0.5 nm) is selected in such a way that a part of electromagnetic radiation 4 is not diffracted in first holographic optical element 7, and thus strikes second holographic optical element 8. This second holographic optical element 8 includes a deflection function for the same second wavelength range. Second holographic optical element 8 thus includes a preferably high diffraction efficiency. However, this deflection function is designed for a second angle of reflection (here, for example, −12 degrees). In the example shown in FIG. 1, the first angle of reflection (first holographic optical element 7) and the second angle of reflection (second holographic optical element 8) are selected as equally opposite. Thus, the first angle of reflection may be, for example, +12 degrees, while the second angle of reflection may be −12 degrees. The first angle of reflection and the second angle of reflection are measured relative to a propagation direction of electromagnetic radiation 4, before this is deflected.

Third holographic optical element 9 in turn deflects electromagnetic radiation 5 in the third wavelength range. This is carried out in the example shown in a third angle of reflection, which lies between the first angle of reflection and the second angle of reflection. Additional holographic optical elements (not shown) may also be provided, which control the other angles of reflection (between 0 degrees and 12 degrees in the example shown) and which have a diffraction efficiency for the remaining wavelength ranges (between 899 nm and 907 nm in the example shown).

As a whole, emitted electromagnetic radiation 3, 4, 5 may include different wavelengths depending on the beam angle, in order to pass an optical bandpass filter (not shown) without loss in a reception path of LIDAR device 1. The electromagnetic radiation is to have a narrow wavelength at larger emission angles than the electromagnetic radiation at smaller emission angles.

A coordination of angles and wavelengths of the emission path with the reception path is thus possible. An optical bandpass filter with a smaller filter width may correspondingly be used at a simultaneously large field of view (FoV) of LIDAR device 1. A LIDAR device 1 with improved signal-to-noise ratio is provided and thus a better performance (for example, greater range) is achieved.

What is claimed is:

1. A LIDAR device, comprising:
    a beam source configured to emit electromagnetic radiation in an emission path, in which at least one holographic optical element is situated for diffracting the emitted electromagnetic radiation;
    a detector configured to detect incident electromagnetic radiation in a reception path, an optical bandpass filter being connected upstream from the detector; and
    a second holographic optical element configured to deflect electromagnetic radiation emitted in the second predetermined wavelength range by a second angle of reflection;
    wherein, depending on a wavelength of the emitted electromagnetic radiation, the holographic optical element effectuates a diffraction by at least one angle of reflection which is matched to a shift of a wavelength of the incident electromagnetic radiation using the bandpass filter,
    wherein the LIDAR device includes at least one first holographic optical element which allows electromagnetic radiation emitted in a first predetermined wavelength range to pass undiffracted,
    wherein the first holographic optical element is configured to deflect electromagnetic radiation emitted in a second predetermined wavelength range by a first angle of reflection, and
    wherein the first angle of reflection and the second angle of reflection have opposite signs relative to a propagation direction of the electromagnetic radiation emitted in the second predetermined wavelength range.

2. A LIDAR device, comprising:
    a beam source configured to emit electromagnetic radiation in an emission path, in which at least one holographic optical element is situated for diffracting the emitted electromagnetic radiation;
    a detector configured to detect incident electromagnetic radiation in a reception path, an optical bandpass filter being connected upstream from the detector; and
    a second holographic optical element configured to deflect electromagnetic radiation emitted in the second predetermined wavelength range by a second angle of reflection;
    wherein, depending on a wavelength of the emitted electromagnetic radiation, the holographic optical element effectuates a diffraction by at least one angle of reflection which is matched to a shift of a wavelength of the incident electromagnetic radiation using the bandpass filter,
    wherein the LIDAR device includes at least one first holographic optical element which allows electromagnetic radiation emitted in a first predetermined wavelength range to pass undiffracted,
    wherein the first holographic optical element is configured to deflect electromagnetic radiation emitted in a second predetermined wavelength range by a first angle of reflection, and
    wherein the LIDAR device includes a third holographic optical element which is configured to deflect electromagnetic radiation emitted in a third predetermined wavelength range by a third angle of reflection.

3. The LIDAR device as recited in claim 2, wherein the first holographic optical element and/or the second holographic optical element and/or the third holographic optical element is a transmission-volume hologram.

4. The LIDAR device as recited in claim 1, wherein the beam source is a broad area laser.

\* \* \* \* \*